Nov. 29, 1955     D. RUSHWORTH     2,725,431
METHOD OF SUPPLYING POWER TO A RECIPROCATING CARRIAGE
Filed April 23, 1951
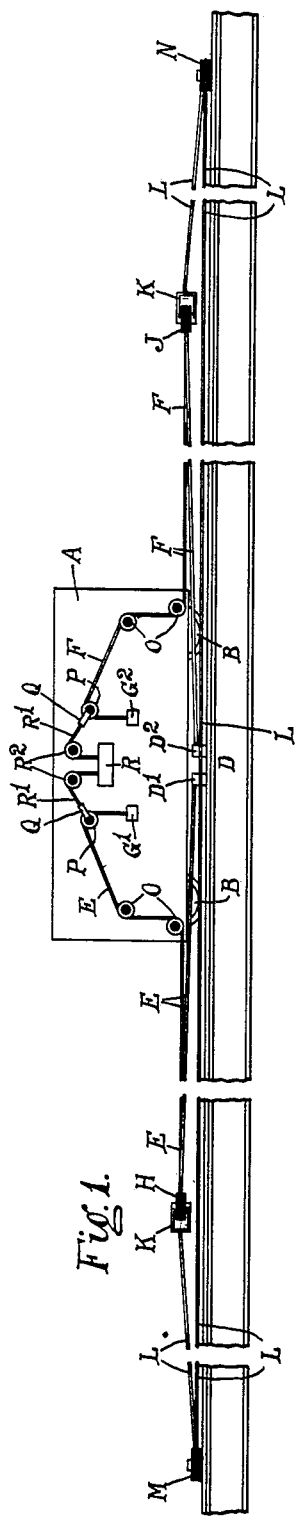
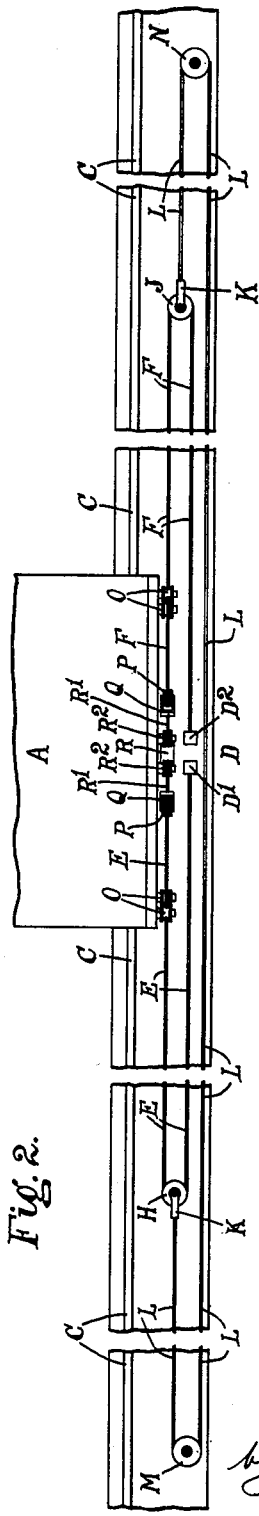
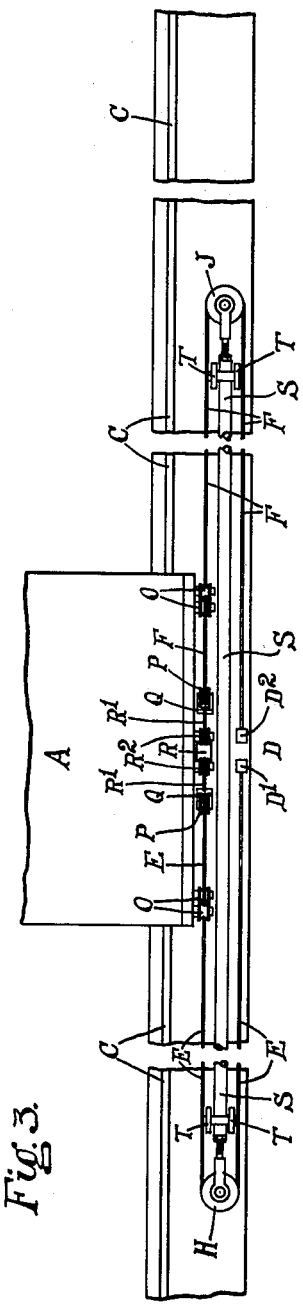

United States Patent Office 2,725,431
Patented Nov. 29, 1955

2,725,431

METHOD OF SUPPLYING POWER TO A RECIPROCATING CARRIAGE

David Rushworth, West Bridgford, England

Application April 23, 1951, Serial No. 222,371

4 Claims. (Cl. 191—12)

This invention relates to an improved method of supplying electric or fluid power to an electrically or fluid driven reciprocating carriage and/or apparatus mounted thereon and its object is to supply the electric or fluid power from a fixed supply point or unit to the reciprocating carriage by means of a cable or a hose which is connected between the supply point or unit and the carriage and prevent sagging or trailing of the cable or hose as the carriage is moved backwards and forwards along a rectilinear path and to effect this result without the use of drums to pay out or take up the cable or hose as the carriage moves backwards and forwards.

According to this invention a carriage adapted to reciprocate along a rectilinear path is connected to a fixed power supply point or unit by two flexible members, one or both of which may supply power, which pass from the power supply point or unit to the carriage around two jockey pulleys disposed respectively on opposite sides of the carriage and the jockey pulleys are connected together by means adapted to maintain them a constant distance apart as the carriage moves along the track. A flexible wire rope may connect the jockey pulleys together, passing round fixed pulleys located at each end of the path traversed by the carriage or the jockey pulleys may be rigidly connected together by a rod or frame. Provision is preferably made for maintaining a constant tension in the flexible members and this may conveniently be done by passing each of the flexible members around a series of pulleys on the carriage and having the axle of one of the pulleys of each series connected to a counterweight by a flexible connection passing round a fixed pulley.

The invention will now be more particularly decribed with reference to the accompanying drawings, in which:

Fig. 1 is a front elevation.

Fig. 2 is a plan showing the method of supplying power to a reciprocating carriage according to this invention.

Fig. 3 is a plan showing an alternative arrangement.

Like letters indicate like parts throughout the drawings.

In the method of carrying out this invention shown in Figs. 1 and 2 the carriage A is provided with wheels B which preferably run on a rectilinear track C, only one rail being shown in the drawings, which may be on the ground or disposed at any desired height above the ground as in the case of a transporter or travelling gantry. The fixed power supply point or unit D is disposed at the side of the path traversed by the carriage and at or near to the centre of the said path and is connected to the carriage by two flexible members arranged in the following manner. When supplying electric power to the carriage A two cables E, F, are connected between the power supply point or unit and the carriage and if both these cables are required to carry electric current to the carriage then two junction boxes $D^1$, $D^2$, may be provided at the fixed power supply point or unit as shown in the drawings and the cables E, F, are connected between these two junction boxes and two junction boxes $G^1$, $G^2$, mounted on the carriage A.

The two cables E, F, are each at least half as long as the path traversed by the carriage and are arranged in the following manner. One cable E passes from one fixed junction box $D^1$ round a jockey pulley H disposed between the carriage A and one end of the track, to the junction box $G^1$ on the carriage A and the other cable F passes from the other fixed junction box $D^2$ round a jockey pulley J disposed between the carriage A and the other end of the track, to the other junction box $G^2$ on the carriage. It will therefore be seen that if the jockey pulleys H, J, are drawn away from the carriage A by a connection with their respective axles, the slack in the cables E, F, will be taken up and that as the carriage moves along the track, the jockey pulleys H, J, will also move in the same direction but at half the speed of the carriage and prevent any sagging of the cables.

In order to effect this result each of the jockey pulleys H, J, is mounted in a yoke K and these yokes are connected together by a flexible wire rope or tow line L which passes from the yokes K round pulleys M, N, mounted on axles fixed at each end of the track. It will therefore be seen that as the carriage moves towards one end of the track one cable will draw its jockey pulley towards the centre of the track and as a result of the tow line connection to the other jockey pulley this will be pulled towards the end of the track to the same extent and the formation of any slack in the other cable prevented.

In order to maintain a constant tension in the cables E, F, and tow line L each cable passes over one or more guide pulleys O on the carriage A to its junction box thereon and disposed between the guide pulley or pulleys and the junction box is another pulley P round which the cable passes and which is carried by a yoke Q which is connected to a counterweight R by a flexible connection $R^1$ which passes over a pulley $R^2$ mounted on a fixed axle. In a convenient arrangement as shown in the drawings one counterweight R may be arranged to maintain a constant tension in both cables. Alternatively a helical coil spring or springs may be used to maintain the tension in the cables and tow line.

In an alternative arrangement shown in Fig. 3, the jockey pulleys H, J, round which the cables E, F, pass from the fixed power supply point or unit D to the carriage A are retained a constant distance apart by a rigid member S which connects the two jockey pulleys H, J, together. This rigid member may be a light frame or rod or tube and its weight may be supported by the cables E, F, or it may be provided with supporting wheels T to run on rails or on the track support as shown in Fig. 3. The member S is made adjustable for length so that any slack which may develop in the cables E, F, can be taken up or provision for taking up the slack may be arranged in a similar manner to that in the previously described arrangement. By the use of the rigid member for retaining the jockey pulleys a constant distance apart, the use of a tow line is obviated.

In the arrangement described above both cables E, F, are arranged to carry electric power from the fixed power point or unit D to the carriage but it will be seen that by the use of a suitable cable only one cable need be utilized to carry power to the carriage. In this case the power carrying cable is connected between the fixed power supply point or unit and a junction box on the carriage and the other cable, which is necessary for the correct working of the arrangement, has one end anchored adjacent the fixed power supply point or unit and its other end anchored adjacent the junction box on the carriage and the two cables pass round jockey pulleys which are interconnected in the same way as in the previously described arrangement and operates in the same manner.

With the method described above of supplying electric power to an electrically driven reciprocating carriage and/or to apparatus mounted thereon the trailing or sagging of the power supply cable or cables is prevented in a simple manner without the use of cable drums or tensioning wire drums and as there is nothing to get out of order maintenance is reduced to the minimum.

It will be readily seen that an arrangement similar to those described above can be used for supplying fluid power to a reciprocating carriage by the use of hose in place of the electric cable and that such hose could be used for supplying liquid or a gas to the carriage and both arrangements could be used together so that the carriage could be supplied with electric power and liquid or a gas.

What I claim is:

1. In a machine having a rectilinear track and a power-driven carriage reciprocable on the track, the combination of a power supply unit permanently mounted approximately midway of the track, two flexible power conductors connected to said power supply unit and extending in opposite directions from said unit and into connection with said carriage, a separate jockey pulley around which each conductor passes, a fixed pulley mounted at each end of the track, a cable running between said fixed pulleys and having each of its ends connected to a jockey pulley, and a tensioning device on the carriage for bearing on the opposite end portions of the conductors.

2. In a machine having a rectilinear track and a power-driven carriage reciprocable on the track, the combination of a power supply unit permanently mounted approximately midway of the track, two flexible power conductors connected to said power supply unit and extending in opposite directions from said unit and into connection with said carriage, a separate jockey pulley around which each conductor passes, a fixed pulley mounted at each end of the track, and a cable carried by both fixed pulleys and having each of its ends attached to one of said jockey pulleys.

3. In a machine having a rectilinear track and a power-driven carriage reciprocable on the track, the combination of a power supply unit permanently mounted approximately midway of the track, two flexible power conductors connected to said power supply unit and extending in opposite directions from said unit and into connection with said carriage, a separate jockey pulley around which each conductor passes, a fixed pulley mounted at each end of the track, a cable carried by both fixed pulleys and having each of its ends attached to one of said jockey pulleys, and a tensioning device on the carriage for bearing on the opposite end portions of the conductors.

4. In a machine having a rectilinear track and a power-driven carriage reciprocable on the track, the combination of a power supply unit permanently mounted approximately midway of the track, two flexible power conductors connected to said power supply unit and extending in opposite directions from said unit and into connection with said carriage, a separate jockey pulley around which each conductor passes, a fixed pulley mounted at each end of the track, a cable carried by both fixed pulleys and having each of its ends attached to one of said jockey pulleys, a counterweight suspended from the carriage and flextible tension means connecting the counterweight to an intermediate point on each power conductor.

References Cited in the file of this patent

UNITED STATES PATENTS

| | | |
|---|---|---|
| 2,201,954 | Flygare | May 21, 1940 |
| 2,321,253 | Schellentrager | June 8, 1943 |
| 2,395,485 | Jones | Feb. 26, 1946 |
| 2,554,984 | Hegel | May 29, 1951 |